United States Patent Office 3,483,174
Patented Dec. 9, 1969

3,483,174
PROCESS FOR COAGULATING LATICES OF CO-
POLYMERS AND TERPOLYMERS OF CONJU-
GATED DIENES AND CARBOXYLIC ACIDS
George B. Libengood and William W. Bowler, Akron,
Ohio, assignors to The Firestone Tire & Rubber Com-
pany, Akron, Ohio, a corporation of Ohio
No Drawing. Filed June 30, 1966, Ser. No. 561,764
Int. Cl. C08d 5/02, 7/02; C08j 1/32
U.S. Cl. 260—83.5                    3 Claims

ABSTRACT OF THE DISCLOSURE

There is provided a process for coagulating carboxyl-containing rubbery polymers characterized by admixing with the polymer latex a polyamine and an acid or the reaction product thereof.

This invention relates to polymers and more particularly to coagulation of carboxyl-containing rubbery polymers and copolymers and particularly butadiene-carboxylic acid copolymers.

Such acidic polymers (the term is used to include copolymers and terpolymers) are usually prepared by aqueous emulsion polymerization to produce a latex. For certain industrial uses the latex must be coagulated. A synthetic rubber latex is coagulated, commonly, by the addition of acid or a salt, or a combination of the two. The acid often used is sulfuric acid and the salts often used are mono- and poly-valent metal salts, as for example, sodium and calcium chlorides. However, these salts and acids are not satisfactory coagulants for the acidic latices because they tend to increase ash content beyond a specified range of less than about 0.2 weight percent, which is about the upper limit of allowable ash when the polymers are commercially used, for example as a binder for solid fuel components, or as insulation for electric wiring. Also, in the case of such latices in which the polymer contains carboxyl groups, the dispersion stabilizers and emulsifiers present therein are not destroyed by use of an acid coagulant alone and coagulation is inhibited. It is, therefore, an object of the present invention to eliminate the mentioned disadvantages and to produce a coagulated polymer of low ash content, having improved commercial utility.

According to the present invention, it has now been discovered that approximately chemically equivalent amounts of a polyamine containing about one to three aliphatic carbon atoms and a mono- or poly-basic acid selected from the group consisting of nonmetallic inorganic acids and organic acids containing about one to three carbon atoms and mixtures thereof, when added to carboxylic latices over a pH range of about 2 to 8 yield a coagulated polymer of low ash content. The acid and polyamine comprising the coagulant can be added in quantities of from about 0.05 part per 100 parts to about 10 parts per 100 parts by weight polymer. The acid and polyamine can be added separately, or they can be combined to form a salt complex prior to the coagulation step.

It has been found that treatment of the polymerization mass with a polyamine followed by treatment with acid, or the utilization of a salt formed by the reaction of acid with a polyamine is effective in destroying stabilizers and emulsifiers and causing coagulation of the polymer.

Examples of useful amines include ethylene diamine, diethylene diamine, diethylene triamine, triethylene tetramine and tetraethylene pentamine, preferred of which is diethylene triamine. Any amine that forms a water soluble polyvalent salt complex may be used.

Examples of acids that may be used are sulfuric, hydrochloric, phosphoric, acetic, formic and nitric, preferred of which is sulfuric.

The polymers of this invention are polymerized from monomer combinations of (A) a conjugated diolefin containing from 4 to 20 carbon atoms, for example: 1,3-butadiene, isoprene, 2,3-dimethyl-1,3-butadiene, and (B) one or more alpha-beta unsaturated carboxylic acids containing from 3 to 6 carbon atoms, for example: acrylic acid, methacrylic acid, maleic acid, fumaric acid, sorbic acid, crotonic acid and itaconic acid, and the mono-esters of the dicarboxylic acids mentioned. For purposes of determining the number of carbon atoms contained in a monoester of a dicarboxylic acid, the ester will be considered equivalent to a monocarboxylic acid, and the total number of carbon atoms will be counted. Other vinyl monomers which may be copolymerized along with (A) and (B) to form terpolymers and other heteropolymers are: aryl olefins and other ethylenically unsaturated nitriles, amides, ketones, ethers, and halides. Specific examples of this third monomer include the following: styrene, alpha-methyl styrene, vinyl toluene, vinylidene chloride, acrylonitrile, and methacrylonitrile.

The monomers are polymerized in an emulsion system under the influence of heat alone and/or a catalyst. The components including water, emulsifier, monomer and catalyst are charged to a reactor and polymerization proceeds at about 114° F. to 160° F. for a number of hours until a pressure drop is observed which represents about 50 to 70 percent conversion. Polymerization can continue up to a theoretical 100 percent although the percent rate of conversion per hour decreases rapidly after 70 percent conversion so it is not practical to carry the conversion beyond about 90 percent conversion. The polymerization is commonly conducted in a closed reaction vessel or autoclave under an inert atmosphere, such as for example argon, nitrogen or helium. Agitation of the mixture, such as stirring, is desirable, as in many chemical reactions, to insure better mixing of the materials. Catalysts, emulsifiers, cross-linkers, wetting agents, buffers, shortstopping agents, chain transfer agents as long chain mercaptans, such as t-dodecyl mercaptan, accelerators as benzoyl disulfide and p-bromobenzoyl disulfide and other conventional polymerization aids may be used in the system as customary in the art.

Catalysts that are used in the polymerization reaction include such free radical reaction catalysts as lauroyl peroxide, hydrogen peroxide, methyl ethyl ketone peroxide, di-t-butyl peroxide, t-butyl peroxide, cumene hydroperoxide, diisopropyl benzene hydro-peroxide, p-menthane hydro-peroxide, caprolyl peroxide, 2,4-dichloro benzoyl peroxide, acetyl peroxide, t-butyl perbenzoate, benzoyl peroxide, bis(p-chloro benzoyl) peroxide, acetyl benzoyl peroxide, hydroheptyl peroxide, cyclohexanone peroxide, cyclohexylhydro peroxide, t-butyl hydro-peroxide, methyl amyl ketone peroxide, methyl cyclohexyl hydro-peroxide, p-chlorobenzoyl peroxide and other catalysts which will effect polymerization, such as potassium persulfate.

Emulsifiers, which are effective at low pH can be used, such as, for example, sodium dodecyl sulfate, sodium hexadecyl sulfate, sodium tetradecyl sulfate, sodium octadecyl sulfate, sodium octodecenyl sulfate, sodium acetoxyoctadecane sulfate, sodium - 1 - sulfonate, sodium octadecane-1-sulfonate and sodium alkyl-naphthalene sulfonate.

The polymerization is carried out in acid media. Suitable buffers may be used during the course of the polymerization to avoid pH changes.

The product of the polymerization, polymer, is in latex form with unreacted monomers. The unstripped latex is transferred from the polymerization reactor to a recovery area. Since the charged monomers are commonly reacted to less than 100 percent conversion, it is often advantageous to recover the unreacted monomers before the latex is coagulated. However, if nonvolatile monomers are present, stripping is not necessary.

The recovery of volatile monomer is usually accomplished in several stages to recover a particular monomer at each stage. The unreacted monomer can be flashed off in a flash tank or it can be passed countercurrent in a stripping column. The monomers are then condensed for reuse. The stripped latex is now ready for coagulation.

Synthetic rubber is coagulated by the method of the present invention by adding the polyamine and acid to the polymer in the required amounts as a salt complex, previously combined, to produce "shock" coagulation, or when conditions are favorable, as when the latex is neutral, the acid and polyamine can be added in any order, separately, as a two-step process. However, the addition of the preformed salt complex to the latex is preferred.

The coagulum is washed, filtered and dried, and is now ready for use.

The polymers may be plasticized and compounded with resins, rubbers, pigments, dyes, antioxidants, antiozidants, stabilizers and the like as well known in the plastic and rubber arts they may be dissolved in solvents and made into paints, enamels, insulation coating composition and other coating composition for application as protective or decorative coatings on wood, steel, glass, cotton, nylon or the like to make various articles as disclosed above.

The following examples are offered to illustrate the invention.

EXAMPLE I

| Components: | Parts by wt. |
|---|---|
| (A) Water | 158.5 |
| (B) Emulsifier solution [1] | 20.03 |
| Water | 15.0 |
| (C) Potassium persulfate | 0.5 |
| (D) Acrylic acid | 17.0 |
| (E) Tertiary dodecyl mercaptan | 0.9 |
| (F) Butadiene monomer | 83.0 |
| (G) Emulsifier solution [1] | 10.02 |

[1] Emulsifier solution:

| Components: | Parts by wt. |
|---|---|
| Water | 24.0 |
| Sodium salt of ethylenediamine tetra-acetic acid (Versene Fe-3) | 0.05 |
| Sodium alkyl aryl sulfonate (Ultra-wet DS) | 6.00 |

Shortstop solution:

| Components: | Parts by wt. |
|---|---|
| Water | 60.0 |
| NaOH | 3.0 |
| Sodium nitrite | 0.014 |
| Polyamine H | 0.025 |
| Sodium dimethyl dithiocarbamate (SDD) in 40 percent solution | 0.50 |

The components A, B, C, D, E and F were charged initially into a closed polymerization vessel previously purged of oxidizing gases in which vessel polymerization was controlled at 115° F. When the polymerization had proceeded to a point at which there was 20 percent solids present in the polymerization reactor, G was added for additional stability. Polymerization was then permitted to continue until total solids representing 88 percent conversion was obtained. At this point, the shortstop solution was added and the reaction killed. The latex pH before the shortstop addition was about 2.4, while after the addition, the pH rose to 5.2. The latex pH was then increased further with 5 percent sodium hydroxide to a pH of about 7.0 and stripped of residual monomer.

EXAMPLE II

A sample of the stripped latex of Example I was coagulated with a premixed diethylenetriamine-sulfuric acid complex coagulant. The coagulant comprised 0.075 weight percent diethylene triamine and 0.107 weight percent sulfuric acid in 100 parts by weight water and was added with violent agitation in an equal volume of latex at 50 percent total solids. The pH of the coagulant was 3.2. The ash content of the resulting polymer was 0.15 weight percent.

EXAMPLE III

As a comparison, coagulation of a sample of the polymer of Example I was attempted using a conventional coagulant. The pH of the latex of Example I was decreased to 4.5 with the addition of 0.3 percent sulfuric acid based on latex. A controlled stream of latex was then added to a 0.5 percent solution of calcium chloride under violent agitation which resulted in coagulation of the latex to rubber crumb. The amount of calcium chloride to rubber was controlled at 3.34 parts by weight per hundred of latex solids. The crumb was water washed and dried at 160° F.–170° F. The resultant dry rubber had an ash content of 0.50 weight percent.

What is claimed is:

1. A process for the shock coagulation of a latex of an acidic copolymer or terpolymer derived from (A) butadiene or isoprene and (B) an alpha-beta unsaturated mono- or di-carboxylic acid or monoesters of dicarboxylic acids containing from 3 to 6 carbon atoms in an acid medium, consisting essentially of admixing with the polymer latex in a pH range of from 2 to 8 and in an amount of from about 0.05 to 10 parts by weight per 100 parts of polymer a preformed salt complex of an alkylene polyamine containing from 2 to 8 carbon atoms and an acid selected from sulfuric, hydrochloric, phosphoric, acetic, formic and nitric acids.

2. The process of claim 1 wherein (A) is butadiene and (B) is acrylic acid or methacrylic acid.

3. The process of claim 5 wherein styrene is copolymerized with (A) and (B).

References Cited

UNITED STATES PATENTS

| 1,797,192 | 3/1931 | Gracia | 260—821 |
| 2,359,667 | 10/1944 | Ogilby | 260—821 |
| 2,576,909 | 12/1951 | Adams | 260—83.5 XR |
| 3,024,223 | 3/1962 | Klapper | 260—83.5 XR |
| 3,330,800 | 7/1967 | Cook | 260—83.5 XR |

JOSEPH L. SCHOFER, Primary Examiner

W. F. HAMROCK, Assistant Examiner

U.S. Cl. X.R.

260—29.7, 78.5, 80.7, 94.7, 821

PO-1050
(5/69)

UNITED STATES PATENT OFFICE
CERTIFICATE OF CORRECTION

Patent No. 3,483,174     Dated Dec. 9, 1969

Inventor(s) George B. Libengood and William W. Bowler

It is certified that error appears in the above-identified patent and that said Letters Patent are hereby corrected as shown below:

Col. 4, line 47

"3. The process of claim 5 wherein styrene is copoly-"

should read as follows:

--3. The process of claim 2 wherein styrene is copoly- --

SIGNED AND
SEALED
MAR 10 1970

(SEAL)
Attest:

Edward M. Fletcher, Jr.
Attesting Officer

WILLIAM E. SCHUYLER, JR.
Commissioner of Patents